Jan. 3, 1933.   J. C. MERWIN   1,893,467
LOCKING PIN CONSTRUCTION
Filed June 12, 1931
Fig. 1
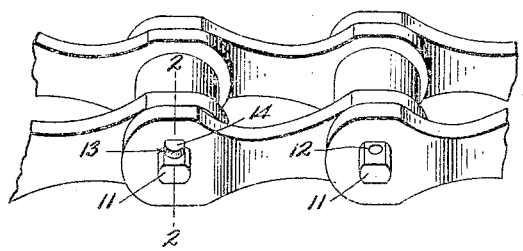
Fig. 2   Fig. 3   Fig. 4
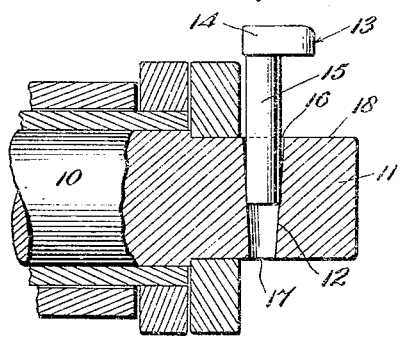 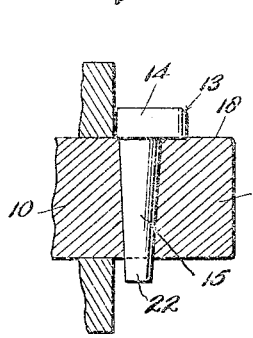 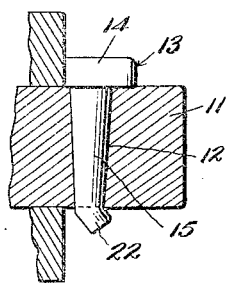
Fig. 5
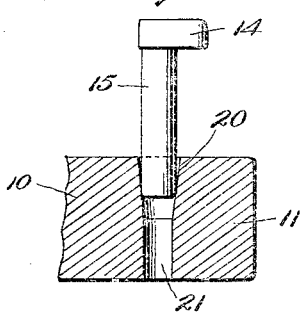
Fig. 6
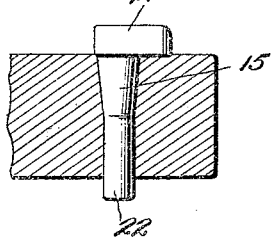
Fig. 7
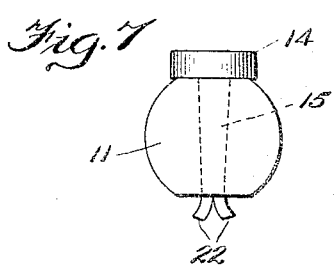
Inventor
J. C. Merwin,
By Barker & Collings
Attorneys Patented Jan. 3, 1933

1,893,467

UNITED STATES PATENT OFFICE

JOHN C. MERWIN, OF MILWAUKEE, WISCONSIN, ASSIGNOR TO CHAIN BELT COMPANY, OF MILWAUKEE, WISCONSIN, A CORPORATION OF WISCONSIN

LOCKING PIN CONSTRUCTION

Application filed June 12, 1931. Serial No. 543,982.

This invention relates to locking pin construction and method and has for one of its objects to provide a construction of this character which will be simple, comparatively inexpensive to manufacture, and more efficient in use than those which have been heretofore proposed.

A further object of the invention is to provide a method of connecting two elements through the deformation and rearrangement of the material of one of the elements during assembly whereby the two may be connected together in a manner which substantially precludes their accidental or unintentional separation under all conditions which they are likely to encounter in actual use.

A still further object of the invention is to provide a locking or cotter pin construction which is particularly adapted for use in connection with high speed power transmitting chains, such for example as those commonly employed in oil well practice, wherein the locking pins which retain the chain elements in place are positioned under heavy hydraulic pressure in such a manner that the material in the pin flows or is rearranged to accommodate itself to the configuration of an aperture formed in the chain pin, with the result that the two are practically permanently locked together and undue vibration, wear and breakage of the cotter pins are prevented.

With the above and other objects in view which will appear as the description proceeds, the invention consists in the novel details of construction constituting the apparatus and the novel steps constituting the method all as will be more fully hereinafter described and particularly pointed out in the appended claims.

Referring to the accompanying drawing forming a part of this specification in which like reference characters designate like parts in all the views:—

Figure 1 is a fragmentary perspective view of a power transmitting sprocket chain illustrating the application of the present invention thereto;

Figure 2 is an enlarged transverse sectional view taken approximately on the plane indicated by the line 2—2 of Figure 1 with the cotter or locking pin partially in place;

Figure 3 is a similar view after the cotter pin has been forced home;

Figure 4 is a view similar to Figure 3, showing how under some circumstances the protruding end of the cotter may be deformed;

Figure 5 is a fragmentary sectional view illustrating a slightly modified form of the invention with the cotter only partially in place;

Figure 6 is a view similar to Figure 5, showing the cotter completely forced home; and Figure 7 is an end elevational view of the form of the invention illustrated in Figures 1 to 4 inclusive, showing a still further manner in which the projecting end of the locking pin may be deformed.

In ordinary roller sprocket chain construction it is customary to fabricate the chain links from stamped steel side bars which are provided with broached holes into which the end portions of cylindrical hollow bushings are forced under heavy pressure whereby substantially U-shaped chain links are formed. Anti-friction rollers may be mounted upon the said bushings before the elements are assembled, and adjacent links are connected together by means of chain pins or pintles which extend through the free ends of the side bars of one link and through the hollow bushings of the next adjacent link. One example of such chain is shown in my prior Patent No. 1,694,275. It is also common in such construction to perforate the projecting end of the chain pin or pintle and to pass through such perforation the ordinary split cotter pin or, as shown in my said patent, a solid cotter pin with some means for preventing the withdrawal of such solid pin.

While such chain construction is quite satisfactory when operated at relatively low speed, it has been found in actual practice that when the operating speed of the chain is considerably increased, as it is of necessity in oil well practice for example, there is a tendency for the cotters heretofore employed to vibrate, wear, break and fly out, with the result that the chain pins themselves work out and the chain becomes disconnected. It has been found from actual practice almost essential in such operations that the cotter pins which retain the chain pintles in place, fit tightly in the aperture through the end of the chain pins so as to prevent vibrating or chattering of the same with consequent wear.

In order to provide a cotter or locking pin construction especially for oil well chains of this character, under the present invention the chain pin or pintle 10 is provided in its projecting end 11 with aperture 12 which is tapered. The solid locking pin 13 is provided, having enlarged head 14 and the cylindrical or straight sided stem 15. The taper of the aperture 12 is such that the larger end 16 of the said aperture is approximately .020 of an inch greater than the diameter of the stem 15, while the smaller end 17 of the said aperture is approximately .020 of an inch less than the diameter of the stem. The end of the stem may therefore be readily introduced into the larger end of the aperture, as indicated in Figure 2, and upon the application of considerable pressure, as for example by means of a hydraulic press, the locking pin 13 may be forced completely into the tapered aperture to the position shown in Figure 3. During such forcing operation, in as much as the material of the pin is usually relatively soft steel, whereas that of the chain pintle is hardened steel, the metal of the locking pin will flow or be rearranged so that its lower end will be reduced and its upper end expanded so that it assumes a tapered form corresponding to and completely filling the tapered aperture. The relative dimensions of the aperture and pin are such that when the head 14 seats upon the surface 18 of the chain pintle the metal of the stem will have been rearranged to completely fill and assume the configuration of the aperture.

Actual tests of pins thus inserted have shown that it requires a force in excess of two thousand pounds to remove the pin and since the latter completely fills the aperture all danger of vibration or chattering and consequent wear is eliminated. It thus results that such chains may be employed in high speed oil well chain practice without danger of their locking pins wearing, breaking or flying out.

In Figures 5 and 6 there is illustrated a slightly modified form of the invention in which the aperture is tapered through only a portion 20 of its length, the remaining portion 21 being substantially straight. Here again the larger end of the aperture is approximately .020 of an inch greater than the diameter of the pin stem 15, while the smaller end of the tapered portion as well as the straight portion 21 is approximately .020 of an inch less than the diameter of the stem. The pin is, in this case, also forced into the aperture under heavy pressure assuming the shape shown in Figure 6.

While, as above stated, it has been found under actual working conditions that at least two thousand pounds pressure is required to drive one of the pins such as shown in Figure 3, out of position, it may happen that certain peculiar conditions will require the pins to even stand greater pressure, in which event the protruding ends 22 may be deformed by bending them as indicated in Figure 4 or by splitting and bending them as indicated in Figure 7.

It is obvious that those skilled in the art may vary the details of construction as well as the precise steps of the method as above described, without departing from the spirit of the invention, and therefore it is not wished to be limited to the above disclosure except as may be required by the claims.

What is claimed is:

1. In locking-pin construction, an element having an aperture therein of varying cross sectional area; and a locking pin, originally of substantially uniform cross sectional area which is greater than the smallest cross sectional area of said aperture, forced into said aperture, whereby the material of said pin is rearranged and its longitudinal section changed to conform substantially to that of said aperture.

2. In locking-pin construction, an element having an aperture therein; and a locking pin forced into said aperture, said pin being originally of different configuration from that of said aperture, with a portion thereof being larger than a portion of said aperture, the resistance offered to the passage of the larger portion of the pin in the smaller portion of the aperture producing a rearrangement of the material of the pin, to cause it to assume substantially the configuration of the aperture.

3. In locking-pin construction an element having a tapered aperture therein; and a locking pin originally having parallel sides forced into said aperture, said pin being of lesser dimension than the larger portion of said aperture and of greater dimension than the smaller portion of said aperture, whereby the resistance offered to the passage of a portion of the pin through the smaller portion of the aperture will produce a rearrangement of the material of the pin and cause it to substantially completely fill the aperture.

4. In a sprocket chain comprising spaced side bars and transverse pintles the ends of which extend beyond said side bars and are provided with apertures therethrough, locking pins forced into said apertures, said pins being originally of different configuration from that of said apertures and deformed through the resistance offered to their entry into said apertures and caused to assume substantially the configuration of the latter.

5. In a sprocket chain comprising spaced side bars and transverse pintles the ends of which extend beyond said side bars and are provided with tapered apertures therethrough, locking pins forced into said apertures, said pins being originally of different configuration from that of said apertures and having portions larger than the smaller portions of said apertures, whereby they are deformed as they are forced into said apertures and caused to substantially completely fill the latter.

6. In a sprocket chain comprising spaced side bars and transverse pintles the ends of which extend beyond said side bars and are provided with tapered apertures therethrough, locking pins forced into said apertures, said pins having enlarged heads and solid cylindrical stems, the diameter of which is less than that of the larger end and greater than that of the smaller end of said apertures, whereby the metal of said stems is caused to flow as they are forced through the smaller portions of said apertures and to substantially fill the larger portions of said apertures when the heads engage the pintles.

7. In locking-pin construction, an element having a coniform aperture therein; and a solid locking pin, originally of substantially cylindrical shape and of a diameter greater than that of the smaller portion of said aperture, forced longitudinally into said aperture, whereby the resistance offered to the passage of a portion of said pin through the smaller portion of the aperture will produce rearrangement of the material of the pin to reduce the cross sectional area of one portion and increase the cross sectional area of another portion and cause it to substantially completely fill all portions of the aperture.

In testimony whereof, I affix my signature.

JOHN C. MERWIN.